United States Patent [19]

Schreiber

[11] 3,751,209
[45] Aug. 7, 1973

[54] EXTRUSION DIE WITH CHANNELED DIE ENDPLATES

[75] Inventor: Anthony J. Schreiber, Philadelphia, Pa.

[73] Assignee: Standard Oil Company, Chicago, Ill.

[22] Filed: Apr. 2, 1971

[21] Appl. No.: 130,634

[52] U.S. Cl. ............... 425/461, 425/376, 264/177 R
[51] Int. Cl. ............................................. B29d 7/04
[58] Field of Search ........................... 425/376, 461; 264/177 R

[56] References Cited
UNITED STATES PATENTS

| | | | |
|---|---|---|---|
| 1,049,658 | 1/1913 | Brandenberger | 425/461 |
| 2,734,224 | 2/1956 | Winstead | 425/461 X |
| 3,308,222 | 3/1967 | Kovacs | 264/177 R X |

FOREIGN PATENTS OR APPLICATIONS

| | | | |
|---|---|---|---|
| 1,152,249 | 9/1957 | France | 425/461 |
| 1,366,464 | 6/1964 | France | 425/461 |

*Primary Examiner*—R. Spencer Annear
*Attorney*—Arthur G. Gilkes, William T. McClain and Robert W. Fletcher

[57] ABSTRACT

A flat film extrusion die comprising: a body having (1) means defining an inlet recess; (2) a longitudinally extending passageway communicating with said recess; (3) an extrusion manifold in flow communication with said inlet passageway extending substantially the entire width of the die; and (4) opposed wall portions in flow communication with said manifold which form an extrusion passageway leading from said manifold; a set of lips forming an elongated extrusion orifice extending substantially the entire width of the die with said set of lips in communication with said extrusion passageway; two channeled die endplates, one attached to each end of said body encapsulating said manifold, extrusion passageway and die lips, each channeled die endplate comprising a base plate having a principal cavity and a channel leading therefrom, said principal cavity being aligned with the respective ends of the manifold and said channel being aligned with the respective ends of said extrusion passageway.

4 Claims, 5 Drawing Figures

PATENTED AUG 7 1973
3,751,209
FIG. 1
FIG. 2
FIG. 3
FIG. 4
FIG. 5
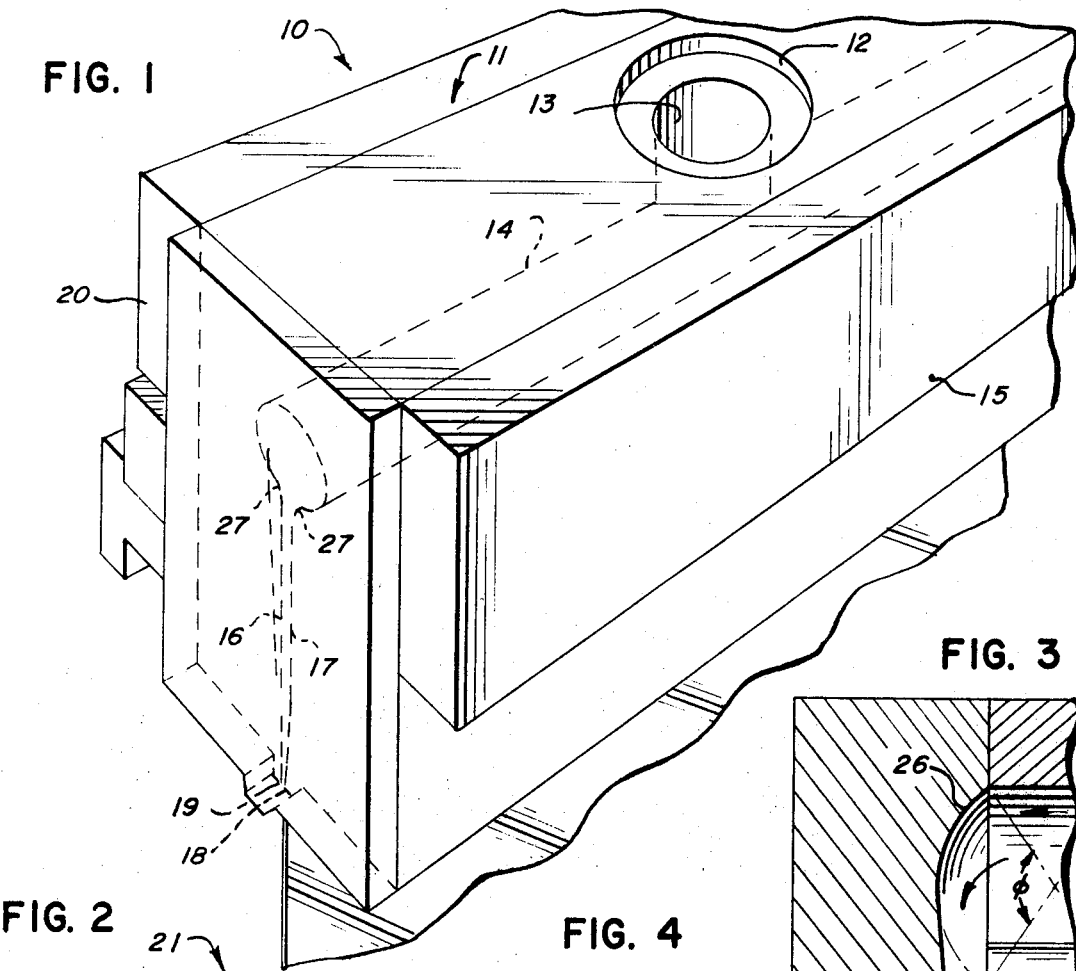
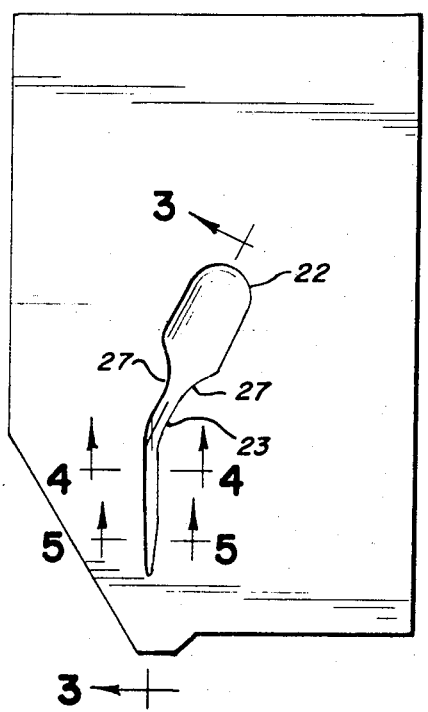
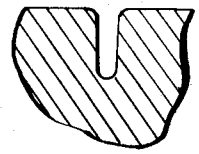
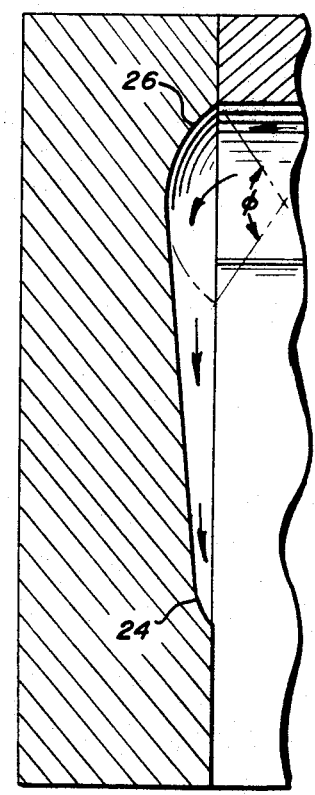
INVENTOR
ANTHONY J. SCHREIBER
BY Robert W. Fletcher
ATTORNEY

EXTRUSION DIE WITH CHANNELED DIE ENDPLATES

BACKGROUND OF THE INVENTION

A typical problem which arises in extruding polymeric resinous film is that the edges of the film may be uneven and nonuniform in the final product. Thus, a strip must be removed from each edge of the film with resultant loss of product and increased expense. The prior art teaches many solutions of the problem of uneven edges of an extruded film. For example, air blasts directed to the edges of the film during extrusion are suggested. The air blasts are intended to curtail edge wobble which is thought to be the cause of uneven edges. Also, the use of an air knife is suggested. Modified chill rolls are also taught as being methods of solving the uneven film edge problem.

A better approach is to ascertain the source of the problem and attempt to eliminate it. Such was the approach used here. The invention described herein eliminates uneven edges on an extruded resinous thermoplastic web by essentially eliminating edge wobble.

The source of the problem was uncovered when it was noticed that even in the most precision extruders there is a pulsing of the hot melt as it leaves the extruder and proceeds through the extrusion die toward the die lips. Realizing that pulsing of the hot melt exists and studying the consequences of this pulsing led to a clear understanding of the problem. It was noticed that the hot melt entered the extrusion die through an inlet recess and proceeded through a longitudinally extending passageway communicating with that recess. The hot melt then entered an extrusion manifold which extended horizontally across substantially the entire width of the die. It was noticed that even though the pulsing of the hot melt tended to be dissipated as it entered the manifold and proceeded horizontally toward the respective ends of the die, a major portion of the pulsing still remained when the hot melt reached the outermost ends of the die manifold. It was ascertained that this pulsing hot melt contacted the die endplates at the respective ends of the manifold and rebounded or flowed back therefrom, tending to set up turbulence within the hot melt causing the edges of the extrudate to wobble with resultant irregular edges of the product film. The invention of this disclosure solves the problem of the pulsing melt rebounding from the die endplates and creating turbulence.

SUMMARY OF THE INVENTION

A flat film extrusion die comprising: a body having (1) means defining an inlet recess; (2) a longitudinally extending passageway communicating with said recess; (3) an extrusion manifold in flow communication with said inlet passageway extending substantially the entire width of the die; and (4) opposed wall portions in flow communication with said manifold which form an extrusion passageway leading from said manifold; a set of lips forming an elongated extrusion orifice extending substantially the entire width of the die with said set of lips in communication with said extrusion passageway; two channeled die endplates, one attached to each end of said body encapsulating said manifold, extrusion passageway and die lips, each channeled die endplate comprising a base plate having a principal cavity and a channel leading therefrom, said principal cavity being aligned with the respective ends of the manifold and said channel being aligned with the respective ends of said extrusion passageway.

The channeled endplates of this invention have been found to be effective in receiving the pulsing hot melt which is flowing horizontally through the die manifold, and damping the resultant turbulence at the manifold ends but beyond the effective width of the extrusion die. This feature has resulted in extruded thermoplastic webs having remarkably uniform edges.

DESCRIPTION OF THE DRAWINGS

FIG. 1 is a partial perspective view of the die of this invention having a channeled endplate positioned thereon.

FIG. 2 is an elevational side view of a channeled die endplate of this invention.

FIG. 3 is a cross-sectional elevational view of the channeled die endplate shown in FIG. 1.

FIG. 4 is a partial sectional view taken along the line 4—4 of FIG. 2.

FIG. 5 is a partial cross-sectional view taken along the line 5—5 of FIG. 2.

PREFERRED EMBODIMENTS

In FIG. 1 die 10 is comprised of body 11 having hot melt inlet recess 12 and longitudinally extending passageway 13 in communication therewith. Extrusion manifold 14 is contained within body 11 and is in flow communication with longitudinally extending passageway 13. Extrusion manifold 14 extends substantially the entire width of the die. Body 11 also contains opposed wall portions 16 and 17 which form a closed extrusion passageway leading from manifold 14. Opposed wall portions 16 and 17 are commonly referred to by those skilled in the extrusion art as the die preland. Opposed wall portions 16 and 17 extend downwardly and terminate in die lips 18 and 19. Most commonly one of the die lips 18 or 19 is mechanically attached to body 11 and adjustable while the other is integral with body 11. Body 11 may also have attached heater elements 15 and 20.

The principal feature of this invention is channeled endplate 21. Two such channeled endplates are contemplated herein. One channeled endplate 21 is attached at either end of body 11 and encapsulates the respective ends of manifold 14. Channeled endplate 21 has a principal cavity 22 and a channel 23 leading from principal cavity 22. In its operating position, channeled endplate 21 is attached to die 10 so that principal cavity 22 is aligned with the end of manifold 14 and channel 23 is aligned with opposed wall portions 16 and 17. Channeled endplates 21 reduce pulsing of the hot melt at the end of manifold 14.

To better understand the pulsing phenomena, it is important to realize that the heat placticized thermoplastic resin which is extruded from an extruder (not shown) varies in velocity and tends to flow in channels. At the ends of the manifold, there then exists a condition which results from the variance of velocity and channeling of the heat plasticized thermoplastic resin. This condition is essentially a pulsation in the flow of the heat plasticized thermoplastic resin. The pulsating heat plasticized thermoplastic resin reaches the end of the die manifold and impacts against the die endplates. The heat plasticized thermoplastic resin responds or flows from the endplates to cause turbulence at the ends of the die manifold. It is the hitting and responding of the heat plasticized thermoplastic resin against the endplates which is curtailed by the channeled endplates of this invention. The channeled endplates of this invention allow the pulsations of the heat plasticized thermoplastic resin to be dissipated in the die endplates beyond the outer extent of the die orifice, therefore, the entire width of the die is effectively utilized. What is thought to occur is shown in FIG. 3 where arrows indicate the vector of flow of heat plasticized thermoplastic resin as it is dissipated and incorporated into the extrudate flow by the channeled endplates of this invention. It is clear from FIG. 3 that turbulence is eliminated and that laminar flow of heat plasticized thermoplastic resin is promoted by the channeled endplates. FIG. 3 also shows that channel 23 tapers gradually as shown at 24 to route the heat plasticized thermoplastic resin into the die extrusion area at the preland area of the die.

It has been found that the contour of the principal cavity at point 26 is quite important. This contour should be generally hemispherical at point 26. The depth of principal cavity 22 is also important. Obviously it cannot be so deep as to protrude through endplate 21. The following example gives a formula which can be used to calculate the depth of principal cavity 22 based upon the diameter of the die manifold. After having calculated the appropriate depth of principal cavity 22, one may proceed with the machining of channel 23.

FIGS. 4 and 5 show that channel 23 is narrowest at its lowermost extremity and gradually widens and finally flares into principal cavity 23. The cross section of channel 23 is not limited to a U shape, but, rather, it may be a V shape or a modification of either a U shape or a V shape. It is, of course, necessary that all of the surfaces comprising principal cavity 22 and channel 23 be smooth, since any imperfections will result in the entrapment and subsequent degradation of heat plasticized thermoplastic resin therein. In FIG. 2 it will be noted that principal cavity 22 is shown to be somewhat elongated as opposed to FIG. 1, where principal cavity 22 is shown to be nearly hemispherical. Such an elongated principal cavity is, of course, used when the die manifold is accordingly elongated. In either embodiment, flared portion 27 is necessary to create smooth lines of flow between principal cavity 22 and channel 23.

EXAMPLE I

Heat plasticized polypropylene resin was extruded through a die fitted with the channeled endplates of this invention. The die endplates were positioned one on each end of the die manifold. These endplates were fashioned to coincide identically with the respective ends of the manifold and the die preland. The principal cavity of the endplates had a depth which was determined in accordance with the formula:

$$\text{Depth} = (\text{Chord}/2)\cdot\tan(\phi/4) \quad (1)$$

where the chord was taken to be the diameter of the die manifold, and $\phi$ was determined by the formula:

$$\text{Chord} = (2R\cdot\sin\phi/2) \quad (2)$$

where $R$ was experimentally selected as having a value of 0.875 for polypropylene. Solution of equation (2) gave a $\phi$ of 118°15'. (See FIG. 3.) The depth of the principal cavity was then made 0.425 inches in accordance with formula (1). The principal cavity had a radius of 0.750 inches.

The radius of the flare at point 27 was selected as 0.75 inches. This flare blended into the sidewall of the principal cavity and also into the sidewall of the principal channel. The principal cavity and the principal channel are then contiguous by virtue of the flare. The principal channel of the endplate was generally U-shaped and 0.125 inches wide across the mouth at its point of junction with the flare. The principal channel extends downwardly at a uniform width of 0.125 inches over a major portion of its length and then gradually narrows to a width of about 0.075 inches at a point just before it becomes flush with the endplate surface adjacent the preland area above the land of the die.

Film was produced by extruding heat plasticized polypropylene through a die equipped with the channeled endplate described above. The edges were more uniform than those of the film from the same die when channeled endplates were not used.

Having thus described the invention what is claimed is:

1. A flat film extrusion die comprising:
   a body having
   1. means defining an inlet recess;
   2. a longitudinally extending passageway communicating with said recess;
   3. an extrusion manifold extending substantially the entire width of the die in flow communication with said longitudinally extending passageway;
   4. opposed wall portions in flow communication with said manifold which form an extrusion passageway leading from said manifold;
   5. a set of lips forming an elongated extrusion orifice extending substantially the entire width of the die with said set of lips in communication with said extrusion passageway; and
   6. two channeled die endplates, one attached to each end of said body encapsulating said manifold, extrusion passageway, and die lips, each channeled die endplate comprising a base plate having a principal cavity and a channel leading therefrom, said principal cavity being aligned with the end of the manifold and said channel being aligned with the end of said extrusion passageway and terminating at a point intermediate the manifold and the die lips.

2. The die of claim 1 wherein the channel of each of said channeled die endplates is flared outwardly to become contiguous with its respective principal cavity.

3. The die of claim 1 wherein said principal cavity of each of said channeled die endplates is generally hemispherical and each channel leading respectively therefrom is generally U shaped.

4. The channeled endplates of claim 3 wherein each of the channels decreases in width and depth from its flared junction with the principal cavity until it becomes flush with its respective base plate.

* * * * *